United States Patent
Sakawaki et al.

(10) Patent No.: US 6,818,331 B2
(45) Date of Patent: Nov. 16, 2004

(54) MAGNETIC RECORDING MEDIUM, PRODUCTION PROCESS THEREOF, AND MAGNETIC RECORDING AND REPRODUCING APPARATUS

(75) Inventors: Akira Sakawaki, Chiba (JP); Kenji Shimizu, Chiba (JP); Hiro Mochizuki, Chiba (JP); Masato Kokubu, Chiba (JP); Hui Yang, Chiba (JP); Masakazu Kobayashi, Chiba (JP); Hiroshi Sakai, Chiba (JP)

(73) Assignee: Showa Denko Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/228,952

(22) Filed: Aug. 28, 2002

(65) Prior Publication Data

US 2003/0082407 A1 May 1, 2003

Related U.S. Application Data

(60) Provisional application No. 60/316,984, filed on Sep. 5, 2001.

(30) Foreign Application Priority Data

Aug. 28, 2001 (JP) ..................................... P2001-257624

(51) Int. Cl.$^7$ ............................. G11B 5/66; G11B 5/70; B32B 3/02

(52) U.S. Cl. ......................... 428/694 TS; 428/694 TM; 428/900; 428/65.3
(58) Field of Search ....................... 428/694 TS, 694 T, 428/694 TM, 900, 65.3

(56) References Cited

U.S. PATENT DOCUMENTS

2003/0157373 A1 * 8/2003 Kirino et al. ......... 428/694 DE

OTHER PUBLICATIONS

Machine translation of JP 2001–216619, Oct. 2001, Japan, Kirino et al.*

* cited by examiner

*Primary Examiner*—Holly Rickman
(74) *Attorney, Agent, or Firm*—Sughrue Mion, PLLC

(57) ABSTRACT

A magnetic recording medium having a non-magnetic substrate; an orientation-regulating layer for regulating the crystal orientation of a layer provided directly thereon; a perpendicular magnetic layer in which easy-magnetization axes are oriented generally perpendicular to the substrate; and a protective layer is disclosed. The perpendicular magnetic layer is formed from a material containing Co as a primary component and at least Cr, Pt, and Nd. A process to produce the magnetic recording medium and a magnetic recording and reproducing apparatus are also disclosed.

12 Claims, 3 Drawing Sheets

MAGNETIC RECORDING MEDIUM, PRODUCTION PROCESS THEREOF, AND MAGNETIC RECORDING AND REPRODUCING APPARATUS

CROSS-REFERENCE TO RELATED APPLICATIONS

This application claims benefit of Provisional Application 60/316,984 filed Sep. 5, 2001, incorporated herein by reference, under 35 U.S.C. §111(b), pursuant to 35 U.S.C. §119(e)(1).

BACKGROUND OF THE INVENTION

1. Field of the Invention

The present invention relates to a magnetic recording medium which is employed in, for example, hard disk devices, to a process for producing the magnetic recording medium, and to a magnetic recording and reproducing apparatus. More particularly, the present invention relates to a magnetic recording medium exhibiting excellent recording and reproduction characteristics.

2. Background Art

The recording density of a hard disk device (HDD), which is a magnetic recording and reproducing apparatus, has increased by at least 60% per year, and this tendency is expected to continue. Therefore, magnetic recording heads and magnetic recording media which are suitable for attaining high recording density have been developed.

Most commercially available magnetic recording media for producing hard disk devices are of a longitudinal recording type, in which easy-magnetization axes in a magnetic layer are oriented generally horizontally with respect to a substrate. The term "easy-magnetization axis" refers to an axis which is easily magnetized. In the case of a Co-based alloy, the c axis of a Co hcp structure is an easy-magnetization axis.

When recording density is increased in such a longitudinal magnetic recording medium, the per-bit volume of a magnetic layer becomes excessively small, and recording and reproduction characteristics of the medium may deteriorate because of thermal instability. In addition, when recording density is increased, the effect of a diamagnetic field at a recording bit boundary causes an increase in medium noise.

In contrast, in a perpendicular magnetic recording medium in which easy-magnetization axes in a magnetic film are oriented generally perpendicular to a substrate, even when recording density is increased, a diamagnetic field exerts minimal effect at a recording bit boundary, and recording magnetic domains having clear boundaries are formed, thus enabling noise reduction. Furthermore, even when recording density is increased, bit volume can be relatively increased, and thus thermal stability can be enhanced. Therefore, a perpendicular magnetic recording medium has recently become of interest, and a medium structure suitable for perpendicular magnetic recording has been proposed.

In recent years, there has been a demand for magnetic recording media of higher recording density. In accordance with this trend, employment of a single-pole type head exhibiting excellent ability to record data onto a perpendicular magnetic layer has been proposed. In order to realize employment of such a head, there has been proposed a magnetic recording medium in which a layer formed from a soft magnetic material (called a "soft back layer") is provided between a substrate and a perpendicular magnetic layer serving as a recording layer, to thereby enhance efficiency in magnetic flux flow between the single-pole type head and the medium.

However, the aforementioned magnetic recording medium including a soft back layer is not satisfactory in terms of recording and reproduction characteristics, thermal stability, and recording resolution, and thus demand has arisen for a magnetic recording medium which exhibits excellent recording and reproduction characteristics.

Japanese Patent Application Laid-Open (kokai) No. 2-103715 discloses a magnetic recording medium including a perpendicular magnetic layer formed from a Co—Cr-based alloy to which a rare earth element such as Nd is added as a third element. However, mere addition of Nd to a Co—Cr-based alloy results in insufficient improvement in magnetic characteristics of the resultant magnetic recording medium, including coercive force, the ratio of residual magnetization (Mr) to saturation magnetization (Ms); i.e., Mr/Ms, nucleation field (−Hn), and perpendicular magnetic anisotropy ((Hc-v) (i.e., coercive force in a direction perpendicular to a substrate)/(Hc-i) (i.e., coercive force in a direction parallel to the substrate)). Even when a large amount of Nd is added, satisfactory improvement of the aforementioned magnetic characteristics attributed to an increase in magnetic anisotropy constant (Ku) was not attained, and recording and reproduction characteristics may be deteriorated as a result of an increase in noise.

As a general measure, there has been proposed a technique for incorporating a large amount of Pt (16 to 26 at %) into a Co alloy employed for forming a magnetic layer in order to increase the magnetic anisotropy constant (Ku) of the Co alloy. However, when a magnetic layer is formed from a Co alloy material containing a large amount of Pt, magnetic interaction between grains in the magnetic layer becomes very strong, and thus noise becomes large, thereby rendering the magnetic layer unsuitable for high-density recording.

Therefore, demand has arisen for a magnetic material which can suppress an increase in noise while increasing Ku in a perpendicular direction, and a magnetic recording medium exhibiting high Ku and low noise.

BRIEF SUMMARY OF THE INVENTION

In view of the foregoing, an object of the present invention is to provide a magnetic recording medium which enables improvement of recording and reproduction characteristics and thermal stability, to thereby attain high-density recording and reproduction of data.

Another object of the present invention is to provide a process for producing the magnetic recording medium.

Yet another object of the present invention is to provide a magnetic recording and reproducing apparatus including the medium.

In order to solve the aforementioned problems, the present inventors have performed extensive studies on a technique for incorporating Nd into a magnetic material containing Co as a primary component and also containing Cr and Pt, and on the relation between compositional proportions of these elements and recording and reproduction characteristics of a magnetic recording medium, to thereby accomplish the present invention. Accordingly, the present invention provides the following embodiments for solving the aforementioned problems.

1) A magnetic recording medium comprising, in order, a non-magnetic substrate; an orientation-regulating layer for regulating the crystal orientation of a layer provided directly thereon; a perpendicular magnetic layer in which easy-magnetization axes are oriented generally perpendicular to the substrate; and a protective layer; and wherein the perpendicular magnetic layer is formed from a material containing Co as a primary component and at least Cr, Pt, and Nd, a ratio of residual magnetization (Mr) in a direction perpendicular to the substrate to saturation magnetization (Ms) in a direction perpendicular to the substrate s at least 0.85, and an activation magnetic moment represented by the product of activation volume and saturation magnetic moment is $0.3 \times 10^{-15}$ emu to $0.8 \times 10^{-15}$ emu.

2) A magnetic recording medium according to 1), wherein a coercive force in a direction perpendicular to the substrate is at least 2,500 Oe, and a ratio of the coercive force (Hc-v) in a direction perpendicular to the substrate to the coercive force (Hc-i) in a direction parallel to the substrate is at least 5.

3) A magnetic recording medium according to 1) or 2), wherein a nucleation field in a direction perpendicular to the substrate is 0 to 2,000 Oe.

4) A magnetic recording medium according to 1) or 2), wherein the perpendicular magnetic layer is formed from a material containing Cr in an amount of 18 to 28 at %, Pt in an amount of 10 to 20 at %, and Nd in an amount of 0.5 to 8 at %.

5) A magnetic recording medium according to 1) or 2), wherein the perpendicular magnetic layer is formed from a material further containing at least one element selected from the group consisting of B, Ta, and Cu, in which the total amount of these elements is 8 at % or less.

6) A magnetic recording medium comprising a perpendicular magnetic layer containing a plurality of magnetic layers, wherein at least one of the magnetic layers is a perpendicular magnetic layer as recited in 1) or 2).

7) A magnetic recording medium comprising a perpendicular magnetic layer containing a plurality of magnetic layers, wherein the uppermost layer of the magnetic layers is a perpendicular magnetic layer as recited in 1) or 2).

8) A magnetic recording medium according to 1) or 2), wherein a soft magnetic undercoat layer formed from a soft magnetic material is provided between the non-magnetic substrate and the orientation-regulating layer.

9) A magnetic recording medium according to 8), wherein the surface of the soft magnetic layer is oxidized or nitridized.

10) A magnetic recording medium according to 8) or 9), wherein a hard magnetic layer in which magnetic anisotropy is generally in a longitudinal direction is provided between the non-magnetic substrate and the soft magnetic undercoat layer.

11) An magnetic recording medium according to 10), wherein the hard magnetic layer is formed from a material containing a CoSm alloy or a $CoCrPtX_2$ alloy (wherein $X_2$ is at least one element selected from the group consisting of Pt, Ta, Zr, Nb, Cu, Re, Ni, Mn, Ge, Si, O, N, and B, has a coercive force of at least 500 Oe, and has a magnetization direction along a radial direction of the substrate.

12) A process for producing a magnetic recording medium, which comprises successively forming on a non-magnetic substrate, an orientation-regulating layer for regulating the crystal orientation of a layer provided directly thereon, a perpendicular magnetic layer in which easy-magnetization axes are oriented generally perpendicular to the substrate, and a protective layer, wherein, the perpendicular magnetic layer is formed through sputtering by use of a sputtering target comprising a material containing Co as a primary component and at least Cr, Pt, and Nd, and wherein the Cr content is 18 to 28 at %, the Pt content is 10 to 20 at %, and the Nd content is 0.5 to 8 at %.

13) A process for producing a magnetic recording medium according to 12), wherein, when the perpendicular magnetic layer is formed, the pressure of a sputtering gas is regulated to 3 to 20 Pa.

14) A process for producing a magnetic recording medium according to 12) or 13), which further comprises forming a soft magnetic layer before formation of the orientation-regulating layer, and exposing the surface of the soft magnetic layer to a gas selected from among oxygen gas, nitrogen gas, a mixture of oxygen gas and nitrogen gas, and a gas containing oxygen gas and nitrogen gas.

15) A magnetic recording and reproducing apparatus comprising a magnetic recording medium and a magnetic head for recording data onto the medium and reproducing the data therefrom, wherein the magnetic recording medium is a magnetic recording medium as recited in 1) or 2).

As used herein, the term "primary component" refers to a component which is contained in an alloy in the greatest amount, preferably in an amount of more than 50 at %.

DETAILED DESCRIPTION OF THE INVENTION

Figure 1:
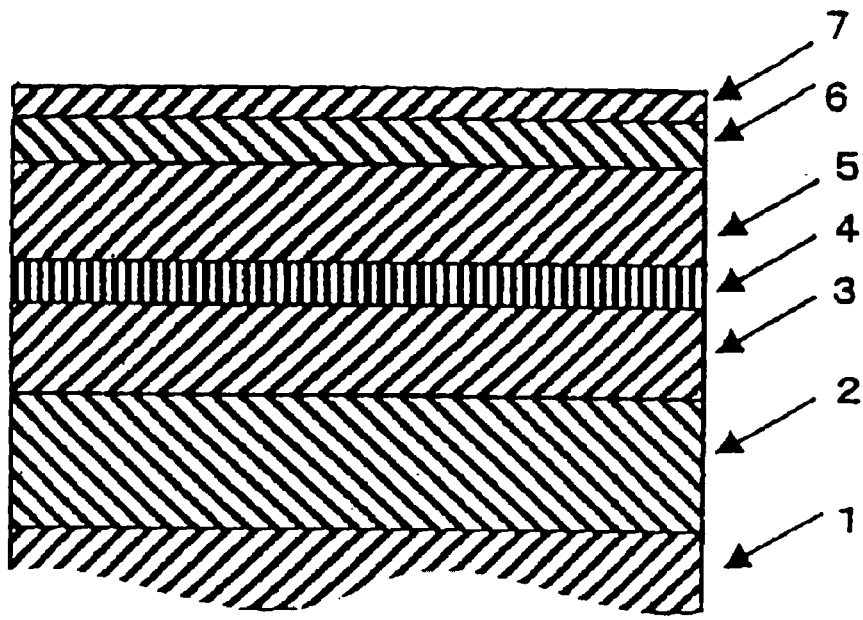
FIG. 1 is a cross-sectional view showing a first embodiment of the magnetic recording medium of the present invention.

The magnetic material employed in the present invention contains at least Cr, Pt, and Nd. When Nd is incorporated in the presence of Pt, the amount of Pt required for attaining excellent magnetic characteristics can be reduced. Therefore, without increasing noise of the magnetic recording medium during recording and reproduction, which increase would otherwise be caused by an increase in Pt content, recording and reproducing characteristics, such as resolution, can be improved, and thermal stability of magnetization can be enhanced.

The effect of incorporation of Nd will be described with reference to Table 1.

TABLE 1

| Sample | Composition (at %) | Coercive force (Oe) | Mr/Ms | -Hn (Oe) | Hc-v/Hc-i | vIsb ($\times 10^{-15}$ emu) |
|---|---|---|---|---|---|---|
| 1 | Co20Cr14Pt | 2700 | 0.81 | -200 | 3 | 0.75 |
| 2 | Co20Cr16Pt | 3500 | 0.85 | 0 | 3 | 0.82 |
| 3 | Co20Cr18Pt | 3800 | 0.91 | 50 | 3 | 0.85 |
| 4 | Co20Cr20Pt | 4200 | 0.95 | 500 | 3 | 0.93 |

TABLE 1-continued

| Sample | Composition (at %) | Coercive force (Oe) | Mr/Ms | -Hn (Oe) | Hc-v/Hc-i | vlsb ($\times 10^{-15}$ emu) |
|---|---|---|---|---|---|---|
| 5 | Co20Cr24Pt | 4500 | 1 | 1500 | 3 | 1.1 |
| 6 | Co20Cr10Pt | 2400 | 0.75 | -800 | 3 | 0.55 |
| 7 | Co20Cr10Pt2Nd | 2950 | 0.95 | 0 | 5 | 0.55 |
| 8 | Co20Cr10Pt4Nd | 3800 | 1 | 200 | 7 | 0.57 |
| 9 | Co20Cr10Pt6Nd | 4300 | 1 | 1100 | 9 | 0.6 |
| 10 | Co20Cr10Pt8Nd | 4600 | 1 | 1000 | 8 | 0.62 |
| 11 | Co20Cr10Pt10Nd | 4000 | 1 | 300 | 5 | 0.75 |
| 12 | Co18Cr | 1000 | 0.53 | -1500 | 2 | 1.1 |
| 13 | Co18Cr5Nd | 1200 | 0.53 | -1400 | 2 | 1.15 |
| 14 | Co18Cr10Nd | 1100 | 0.53 | -1450 | 2 | 1.2 |
| 15 | Co20Cr8Pt | 2200 | 0.61 | -1000 | 2 | 0.6 |
| 16 | Co20Cr8Pt6Nd | 2300 | 0.62 | -1000 | 2 | 0.6 |

Table 1 shows magnetic characteristics and recording and reproduction characteristics of magnetic recording media, each medium including a non-magnetic substrate; an Ru film (thickness: 20 nm) serving as an orientation-regulating layer, the film being formed on the substrate; and a film (thickness: 20 nm) formed from a magnetic material having a composition shown in Table 1, the film being provided on the Ru film and serving as a perpendicular magnetic recording layer.

The "coercive force" shown in Table 1 is that in a perpendicular direction. When the coercive force is large, resolution characteristics during recording and reproduction are excellent, and thermal stability of magnetization is high. The ratio (Mr/Ms) is an index for expressing thermal stability of magnetization of the magnetic layer. The value (-Hn) is an index for expressing thermal stability of magnetization of the magnetic layer. The ratio (Hc-v)/(Hc-i) is an index for expressing the degree of orientation of easy-magnetization axes of Co alloy crystals constituting the magnetic layer in a direction perpendicular to the substrate.

The expression "vlsb" represents activation magnetic moment, and the activation magnetic moment closely relates to the amount of noise generated during read/write. The smaller the activation magnetic moment, the lower the noise. The activation magnetic moment (vlsb) is calculated on the basis of time-dependent data of coercive force (Hc-v) in a direction perpendicular to the perpendicular magnetic layer as measured at room temperature by use of a VSM. The activation magnetic moment (vlsb) is calculated as follows.

(I) Time-dependent data of coercive force are substituted into the below-described Sharrock equation (see J. Appl. Phys. 62 (7), page 2918), to thereby calculate $(Ku \times V)/(k \times T)$.

$$\Delta(Hc\text{-}v) = Hc0\{1 - [(k \times T/Ku \times V)\Delta\ln(At/0.693)]^n\} \quad [E1]$$

$A = 1 \times 10^9$, $n = 0.5$, k: Boltzmann's constant, Hc0: theoretical maximum coercive force Specifically, the activation magnetic moment (vlsb) can be obtained as follows.

(1) Hysteresis loops of the perpendicular magnetic layer are obtained at different per-loop cycle times t (e.g., 30 seconds, 60 seconds, 180 seconds, 300 seconds, and 600 seconds), and coercive forces (Hc) of the layer are obtained on the basis of the hysteresis loops. The hysteresis loops may be obtained by use of a typically employed VSM or a Kerr-effect-based magnetic characteristic measurement apparatus.

(2) When time t is varied from $t_1$ to $t_m$, m different data combinations (cycle time, coercive force) are obtained.

(3) On the basis of the above-obtained data, "$\{\ln(A \times t/0.635)\}^{0.5}$" and "Hc" are plotted as x-value and y-value, respectively.

(4) An approximation line is obtained on the basis of the above-plotted data.

(5) The value "$Hc0 \times (k \times T/Ku \times V)^{0.5}$" is obtained on the basis of the slope of the approximation line, and the value "Hc0" is obtained on the basis of the y-axis intercept.

(6) The value "$(Ku \times V)/(k \times T)$" is calculated by use of the above-obtained "$Hc0 \times (k \times T/Ku \times V)^{0.5}$" and "Hc0."

(II) Subsequently, the thus-obtained "$(Ku \times V)/(k \times T)$" is substituted into the below-described equation, to thereby obtain the activation magnetic moment (vlsb).

$$(Ku \times V)/(k \times T) = Hc0 \times vlsb \times 0.5/(k \times T) \quad [E1]$$

In samples 1 through 5 shown in Table 1, the Pt content is increased while the Cr content is maintained at a certain level. As a result, coercive force (Hc) and Mr/Ms ratio are increased. Although -Hn is increased, (Hc-v)/(Hc-i), which represents perpendicular magnetic anisotropy of the magnetic layer, is not varied. The value "vlsb," which closely relates to the amount of noise generated during recording and reproduction, is increased.

The results show that when the Pt content is increased in order to improve magnetic characteristics of the perpendicular magnetic layer, although resolution and thermal stability can be improved, the crystal orientation of the magnetic layer fails to be improved, and interaction between magnetic grains becomes strong, thereby increasing noise.

Meanwhile, as understood from samples 6 through 10 of Table 1, when the amount of Nd to be added is increased while the Pt content is maintained at a certain level, like the case where the Pt content is increased, Hc and Mr/Ms ratio are increased. The results show that -Hn is also increased. Since (Hc-v)/(Hc-i) is increased, the crystal orientation of the magnetic layer is considered to be improved. As a result, Hc, Mr/Ms, and -Hn are considered to be improved. Notably, while such characteristics are improved, an increase in vlsb can be suppressed. According to the present invention, since Nd is incorporated into a magnetic material in the presence of Pt, without increasing noise during recording and reproduction, (Hc-v)/(Hc-i) and magnetic characteristics, such as Hc, Mr/Ms, and -Hn, are improved.

When the incorporation amount of Nd exceeds 8 at %, magnetic characteristics are deteriorated. Meanwhile, when Nd is incorporated into a magnetic material consisting of CoCr or a magnetic material containing Pt in an amount of less than 10 at %, magnetic characteristics are deteriorated. In such a case, since the magnetic anisotropy constant (Ku) of the magnetic material serving as a base material is low, improvement of magnetic characteristics is considered to be insufficient. Therefore, in order to improve magnetic characteristics effectively, preferably, Nd is incorporated into a magnetic material containing Pt in an amount of at least 10 at %.

The reason why magnetic characteristics are improved when Nd is incorporated has not yet been completely clear, but magnetic characteristics are considered to be improved through the following mechanism. When Nd is incorporated into a magnetic material containing Co as a primary component, Co is likely to be partially reacted with Nd, to thereby form an intermetallic compound of Co and Nd (e.g., NdCo5 or Nd2Co17). The intermetallic compound of Nd and Co has the same composition as a raw material of a rare earth element-cobalt magnet. In this connection, an alloy having such a composition is known to have high crystal magnetic anisotropy and a high magnetic anisotropy constant (Ku), and therefore, when such an intermetallic compound is formed, the magnetic anisotropy constant (Ku) of the overall magnetic layer is increased. Furthermore, when easy-magnetization axes of the magnetic layer are oriented in a direction perpendicular to the substrate, perpendicular magnetic anisotropy (Hc-v/Hc-i) is increased. Conceivably, such effects contribute to improvement in magnetic characteristics of the perpendicular magnetic layer, such as coercive force (Hc), Mr/Ms ratio, and −Hn. Unlike the case where merely the incorporation amount of Pt is increased, when Nd is incorporated, segregation of Cr is not impeded. Therefore, conceivably, magnetic grains do not become large, interaction between magnetic grains does not become strong, and noise during recording and reproduction is not increased.

In the absence of Pt, magnetic grains fail to have magnetic anisotropy at a certain level. Therefore, the effect of a diamagnetic field becomes large when magnetization is inverted, and as a result, magnetic characteristics required for high-density recording, such as coercive force, Mr/Ms, and −Hn, are difficult to obtain.

In the magnetic recording medium of the present invention, the perpendicular magnetic layer is formed from a material containing Co as a primary component and also containing at least Cr, Pt, and Nd, the ratio of residual magnetization (Mr) in a direction perpendicular to the substrate to saturation magnetization (Ms) in a direction perpendicular to the substrate; i.e., M r/Ms, is at least 0.85, and activation magnetic moment represented by the product of activation volume and saturation magnetic moment is $0.3 \times 10^{-15}$ emu to $0.8 \times 10^{-15}$ emu.

When an intermediate layer having an hcp structure is provided between the orientation-regulating layer and the magnetic layer, the ratio of residual magnetization (Mr) to saturation magnetization (Ms); i.e., Mr/Ms, coercive force (Hc-v), the ratio of coercive force (Hc-v) in a perpendicular direction to coercive force (Hc-i) in a longitudinal direction; i.e., (Hc-v)/(Hc-i), and nucleation field (−Hn) are improved.

As a result, resolution during recording and reproduction is improved, and thermal stability (i.e., thermal stability) is improved considerably. Since an increase in activation magnetic moment (vIsb) is suppressed, noise is lowered during recording and reproduction, and signal to noise (S/N) ratio required for high-density recording is secured. That is, the magnetic recording medium of the present invention exhibits improved recording and reproduction characteristics.

The term "thermal decay" refers to a phenomenon in which recording bits become unstable and recorded data are thermally lost. In a magnetic recording and reproducing apparatus, thermal decay is manifested in the form of reduction in reproduction output of recorded data with passage of time.

FIG. 1 shows a first embodiment of the magnetic recording medium of the present invention. The magnetic recording medium includes a non-magnetic substrate 1; a soft magnetic undercoat layer 2; an orientation-regulating layer 3; an intermediate layer 4; a perpendicular magnetic layer 5; a protective layer 6; and a lubrication layer 7, the layers 2 through 7 being successively formed on the substrate 1.

The non-magnetic substrate 1 may be a metallic substrate formed from a metallic material such as aluminum or an aluminum alloy, or a non-metallic substrate formed from a non-metallic material such as glass, ceramic, silicon, silicon carbide, or carbon.

A glass substrate may be formed from amorphous glass or glass ceramic. Amorphous glass may be general-purpose glass, such as soda-lime glass, or aluminoborosilicate glass. Glass ceramic may be lithium-based glass ceramic. Meanwhile, a ceramic substrate may be formed from a general-purpose sintered compact predominantly containing aluminum oxide, aluminum nitride, and silicon nitride; or fiber-reinforced material thereof.

The non-magnetic substrate 1 may be any of metallic or non-metallic substrates coated with an NiP layer through plating or sputtering.

In the present invention, the soft magnetic layer 2 is preferably provided beneath the orientation-regulating layer. The soft magnetic undercoat layer 2 is provided for increasing a magnetic flux component from a magnetic head, the component being perpendicular to the substrate, and for causing the perpendicular magnetic layer 5 onto which data are recorded to be magnetized more reliably in a direction perpendicular to the substrate 1. The effect of the soft magnetic undercoat layer 2 is considerably obtained particularly when a single-pole type head for perpendicular recording is employed as a magnetic head for recording and reproduction.

The aforementioned soft magnetic undercoat layer 2 is formed from a soft magnetic material. The soft magnetic material may be a material containing Fe, Ni, and Co. Examples of the material include FeCo-based alloys (e.g., FeCo and FeCoV); FeNi-based alloys (e.g., FeNi, FeNiMo, FeNiCr, and FeNiSi); FeAl-based alloys (e.g., FeAl, FeAlSi, FeAlSiCr, FeAlSiTiRu, and FeAlO); FeCr-based alloys (e.g., FeCr, FeCrTi, and FeCrCu); FeTa-based alloys (e.g., FeTa, FeTaC, and FeTaN); FeMg-based alloys (e.g., FeMgO); FeZr-based alloys (e.g., FeZrN); FeC-based alloys; FeN-based alloys; FeSi-based alloys; FeP-based alloys; FeNb-based alloys; FeHf-based alloys; and FeB-based alloys.

The soft magnetic undercoat layer 2 may be formed from a material containing Fe in an amount of at least 60 at % and having a fine-crystalline structure, such as FeAlO, FeMgO, FeTaN, or FeZrN. Alternatively, the layer 2 may be formed from a material having a granular structure in which fine crystal grains are dispersed in a matrix.

The soft magnetic undercoat layer 2 may also be formed from a Co alloy containing Co in an amount of at least 80 at % and at least one element selected from among Zr, Nb, Ta, Cr, Mo, etc., and having an amorphous structure. Preferred examples of the Co alloy include CoZr-based alloys, CoZrNb-based alloys, CoZrTa-based alloys, CoZrCr-based alloys, and CoZrMo-based alloys.

The coercive force (Hc) of the soft magnetic undercoat layer 2 is preferably 200 Oe or less (more preferably 50 Oe or less). When the coercive force (Hc) exceeds the above range, soft magnetic characteristics become insufficient, and reproduction signal waveforms fail to become rectangular waves and instead assume distorted shapes.

The saturation magnetization (Bs) of the soft magnetic undercoat layer 2 is preferably at least 0.6 T, more preferably at least 1 T. When the Bs falls below the above range, reproduction signal waveforms fail to become rectangular waves and instead assume distorted shapes.

The thickness of the soft magnetic layer is preferably 50 to 400 nm. When the thickness falls within this range, reproduction signal waveforms having no distortion can be obtained.

The product of saturation magnetization Bs (T) and thickness t (nm) of the soft magnetic undercoat layer 2; i.e., Bs·t (T·nm), is preferably at least 20 (T·nm), more preferably at least 40 (T·nm). When Bs·t falls below the above range, reproduction signal waveforms are distorted, and OW characteristics are deteriorated.

At the uppermost surface of the soft magnetic undercoat layer 2 (i.e., the surface facing the orientation-regulating layer 3), preferably, the material constituting the soft magnetic undercoat layer 2 is partially or completely oxidized. That is, at the uppermost surface of the soft magnetic undercoat layer 2 (i.e., the surface facing the orientation-regulating layer 3) and in the vicinity of the surface, preferably, the material constituting the soft magnetic undercoat layer 2 is partially oxidized, or the material is oxidized to form an oxide thereof. Since magnetic fluctuation on the surface of the soft magnetic undercoat layer 2 can be prevented through such oxidation, noise attributed to the fluctuation can be reduced, thereby improving recording and reproduction characteristics of the magnetic recording medium. Furthermore, crystal grains of the orientation-regulating layer 3 to be formed on the soft magnetic undercoat layer 2 can be micronized, thereby improving recording and reproduction characteristics.

The oxidized portion on the surface of the soft magnetic undercoat layer 2 may be formed through the following methods: a method in which the soft magnetic undercoat layer 2 is exposed to an oxygen-containing atmosphere after the layer 2 is formed; and a method in which oxygen is introduced into a process for forming a portion near the surface of the soft magnetic undercoat layer 2. Specifically, when the surface of the soft magnetic undercoat layer 2 is exposed to oxygen, the layer 2 may be maintained for about 0.3 to about 20 seconds in oxygen gas or in a gas obtained by diluting oxygen with, for example, argon gas or nitrogen gas. Alternatively, the soft magnetic undercoat layer 2 may be exposed to air. Particularly when a gas obtained by diluting oxygen with, for example, argon gas or nitrogen gas is employed, since the degree of oxidation of the surface of the soft magnetic undercoat layer 2 can be easily regulated, reliable production can be attained. In the case where oxygen is introduced into a film formation gas employed for forming the soft magnetic undercoat layer 2; for example, when the layer 2 is formed through sputtering, sputtering may be carried out by use of an oxygen-containing process gas during a portion of the film formation process. The process gas is preferably a mixture of argon and oxygen in which the ratio by volume of oxygen is about 0.05% to about 50% (preferably about 0.1 to about 20%).

The orientation-regulating layer 3 is provided for regulating the crystal orientation and grain size of the intermediate layer 4 provided directly on the layer 3 and the crystal orientation and grain size of the perpendicular magnetic layer 5.

No particular limitation is imposed on the material employed for forming the orientation-regulating layer 3. Preferably, the layer 3 is formed from a material having an hcp structure, an fcc structure, or an amorphous structure. Particularly preferably, the layer is formed from an Ru-based alloy, an Ni-based alloy, or a Co-based alloy.

In the magnetic recording medium of the first embodiment, the thickness of the orientation-regulating layer 3 is preferably 0.5 to 40 nm, more preferably 1 to 20 nm. When the thickness of the orientation-regulating layer 3 falls within a range of 0.5 to 40 nm (preferably 1 to 20 nm), the perpendicular orientation of the perpendicular magnetic layer 5 is particularly enhanced, and the distance between a magnetic head and the soft magnetic undercoat layer 2 can be reduced during recording of data. Therefore, recording and reproduction characteristics can be improved without lowering resolution of a reproduced signal. When the thickness falls below the above range, the perpendicular orientation of the perpendicular magnetic layer 5 is lowered, resulting in deterioration of recording and reproduction characteristics and thermal stability. In contrast, when the thickness exceeds the above range, the size of magnetic grains in the perpendicular magnetic layer 5 becomes large, and noise characteristics may be deteriorated. In addition, since the distance between a magnetic head and the soft magnetic undercoat layer 2 becomes large during recording of data, the resolution and output of a reproduced signal are lowered.

The surface configuration of the orientation-regulating layer 3 affects the surface configurations of the perpendicular magnetic layer 5 and the protective layer 6. Therefore, in order to reduce irregularities of the surface of the magnetic recording medium and to reduce the flying height of a magnetic head during recording and reproduction of data, preferably, the average surface roughness (Ra) of the orientation-regulating layer 3 is regulated to 2 nm or less. When the average surface roughness (Ra) is regulated to 2 nm or less, irregularities of the surface of the magnetic recording medium can be reduced, and the flying height of a magnetic head can be reduced sufficiently during recording and reproduction of data, thereby enhancing recording density.

Oxygen or nitrogen may be introduced into a gas for forming the orientation-regulating layer 3. For example, when the orientation-regulating layer 3 is formed through sputtering, the following process gas is preferably employed: a gas mixture of argon and oxygen in which the ratio by volume of oxygen is about 0.05 to about 50% (preferably about 0.1 to about 20%), or a gas mixture of argon and nitrogen in which the ratio by volume of nitrogen is about 0.01 to about 20% (preferably about 0.02 to about 10%).

The intermediate layer 4 may be provided between the orientation-regulating layer 3 and the perpendicular magnetic layer 5. When the intermediate layer 4 is provided, the perpendicular orientation of the perpendicular magnetic layer 5 can be enhanced. Therefore, the coercive force of the perpendicular magnetic layer 5 can be enhanced, and recording and reproduction characteristics and thermal stability can be improved further.

The intermediate layer 4 is preferably formed from a material having an hcp structure. The intermediate layer 4 is preferably formed from a CoCr alloy, a $CoCrX_1$ alloy, or a $CoX_1$ alloy (wherein $X_1$ is one or more elements selected from among Pt, Ta, Zr, Ru, Nb, Cu, Re, Ni, Mn, Ge, Si, O, N, and B).

The Co content of the intermediate layer 4 is preferably 30 to 70 at %. When the Co content falls within this range, the intermediate layer has a non-magnetic property.

The thickness of the intermediate layer 4 is preferably 20 nm or less, more preferably 10 nm or less, in order to prevent deterioration of recording and reproduction characteristics (attributed to formation of large magnetic grains in the perpendicular magnetic layer 5) and lowering of recording resolution attributed to an increase in the distance between a magnetic head and a soft magnetic undercoat layer 2.

The perpendicular magnetic layer 5 in which easy-magnetization axes are oriented generally perpendicular to the substrate is formed from a material containing Co as a primary component and also containing at least Cr, Pt, and Nd. In the perpendicular magnetic layer 5, the Cr content is preferably 18 to 28 at %, more preferably 19 to 24 at %; the Pt content is preferably 10 to 20 at %, more preferably 13 to 18 at %; and the Nd content is preferably 0.5 to 8 at %, more preferably 1 to 4 at %.

When the Cr content is less than 18 at %, the thickness of a grain boundary layer formed between magnetic grains as a result of Cr segregation is reduced, magnetic interaction between magnetic grains becomes strong, and magnetic grains become large. As a result, noise increases during recording and reproduction of data, and signal to noise (S/N) ratio suitable for high-density recording fails to be obtained.

In contrast, when the Cr content exceeds 28 at %, Cr fails to segregate to a grain boundary layer, and the amount of Cr remaining in magnetic grains increases. As a result, coercive force in a perpendicular direction and the ratio of residual magnetization (Mr) to saturation magnetization (Ms); i.e., Mr/Ms, tend to be lowered. In addition, the crystal orientation of magnetic grains is impaired, and the ratio of coercive force (Hc-v) in a perpendicular direction to coercive force (Hc-i) in a longitudinal direction; i.e., (Hc-v)/(Hc-i), may be lowered.

When the Pt content is less than 10 at %, magnetic anisotropy constant (Ku) required for the perpendicular magnetic layer is not obtained, and magnetization becomes thermally unstable. In contrast, when the Pt content exceeds 20 at %, Cr segregation in the magnetic layer is impeded, and coercive force may be lowered as a result of formation of an fcc-structure layer in the magnetic layer. Therefore, the Pt content preferably falls within the above range.

When the Nd content is less than 0.5 at %, the effect of increasing Ku may be lowered. In contrast, when the Nd content exceeds 8 at %, coercive force is lowered, and thus noise may increase during recording and reproduction of data.

B, Ta, and Cu exert the effects of promoting Cr segregation in the magnetic layer, reducing magnetic interaction between grains and the size of magnetic grains, and reducing noise during recording and reproduction of data. The total incorporation amount of these elements is preferably 8 at % or less. When these elements are incorporated in a total amount of more than 8 at %, the elements remain in magnetic grains, and as a result, perpendicular coercive force and the ratio of residual magnetization (Mr) to saturation magnetization (Ms) ; i.e., Mr/Ms, are lowered.

Examples of the magnetic material include Co20Cr14Pt2Nd (Cr content: 20 at %, Pt content: 14 at %, Nd content: 2 at %), Co22Cr12Pt4Nd (Cr content: 22 at %, Pt content: 12 at %, Nd content: 4 at %), Co19Cr14Pt1B1Ta1Nd (Cr content: 19 at %, Pt content: 14 at %, B content: 1 at %, Ta content: 1 at %, Nd content: 1 at %), Co22Cr12Pt2B2Nd (Cr content: 22 at %, Pt content: 12 at %, B content: 2 at %, Nd content: 2 at %), CoCrPtNd-based alloys, CoCrPtBNd-based alloys, CoCrPtTaNd-based alloys, CoCrPtCuNd-based alloys, and CoCrPtBCuNd-based alloys.

The perpendicular magnetic layer 5 may have a single-layer structure formed from the aforementioned magnetic material. Alternatively, the layer 5 may have a multi-layer structure containing a plurality of layers formed from different magnetic materials. When the perpendicular magnetic layer is formed of a plurality of magnetic layers, at least one of the magnetic layers is preferably formed of the aforementioned perpendicular magnetic layer. Particularly, the uppermost layer of the perpendicular magnetic layer preferably contains Nd.

Examples of the magnetic material employed for forming the multi-layer structure include, in addition to the aforementioned materials, CoCrPt-based alloys, CoCr-based alloys, CoCrPtB-based alloys, CoCrPtCu-based alloys, lamination materials containing Co-based alloys (e.g., CoCr, CoB, and Co—SiO$_2$) and Pd-based alloys (e.g., PdB and Pd—SiO$_2$), and combinations of amorphous materials (e.g., TbFeCo) and CoCrPtCu-based materials.

When the perpendicular magnetic layer 5 has a multi-layer structure, an intermediate layer formed from a non-magnetic material may be provided between magnetic layers. Examples of the non-magnetic material which may be employed include non-magnetic metallic materials having an hcp structure; non-magnetic metallic materials having a bcc structure, an fcc structure, or an amorphous structure; metal oxide materials; and metal nitride materials.

The thickness of the perpendicular magnetic layer 5 is preferably 3 to 60 nm, more preferably 5 to 40 nm. When the thickness of the perpendicular magnetic layer 5 falls below the above range, sufficient magnetic flux fails to be obtained, and reproduction output is lowered. In contrast, when the thickness of the perpendicular magnetic layer 5 exceeds the above range, magnetic grains in the layer 5 become large, and recording and reproduction characteristics are deteriorated.

In the perpendicular magnetic layer 5, the ratio of residual magnetization (Mr) in a direction perpendicular to the substrate to saturation magnetization (Ms) in a direction perpendicular to the substrate; i.e., Mr/Ms, is at least 0.85, preferably at least 0.95. When Mr/Ms is less than 0.85, nucleation field is lowered, and thermal stability of the magnetic recording medium is deteriorated.

In the perpendicular magnetic layer 5, activation magnetic moment (vIsb) represented by the product of activation volume (v) and saturation magnetization (Is) is $0.3 \times 10^{-15}$ emu to $0.8 \times 10^{-15}$ emu, preferably $0.4 \times 10^{-15}$ emu to $0.7 \times 10^{-15}$ emu. When vIsb is less than $0.3 \times 10^{-15}$ emu, since magnetic cluster size becomes excessively small and the layer 5 becomes thermally unstable, the magnetic recording medium becomes prone to thermal decay. In contrast, when vIsb exceeds $0.8 \times 10^{-15}$ emu, noise increases during recording and reproduction of data, and signal to noise (S/N) ratio required for high-density recording fails to be obtained.

Coercive force (Hc-v) of the magnetic layer in a perpendicular direction is preferably at least 2,500 Oe. When the coercive force is less than 2,500 Oe, the magnetic recording medium is not suitable for high-density recording, and thermal stability of the medium is lowered.

Perpendicular magnetic anisotropy represented by the ratio of coercive force (Hc-v) in a perpendicular direction to coercive force (Hc-i) in a longitudinal direction; i.e., (Hc-v)/(Hc-i), is preferably at least 5. When (Hc-v)/(Hc-i) is less than 5, the crystal orientation of the magnetic layer is impaired, and the C axis (i.e., easy-magnetization axis) of Co is deviated from a plane perpendicular to the substrate. Therefore, coercive force (Hc-v), Mr/Ms ratio, and nucleation field (−Hn) tend to be lowered. Furthermore, magnetization becomes thermally unstable, thermal decay occurs, and noise increases during recording and reproduction of data.

The nucleation field (−Hn) of the perpendicular magnetic layer 5 is preferably 0 to 2,000 Oe, more preferably 0 to 1,500 Oe. When the nucleation field (−Hn) is less than 0, the magnetic recording medium exhibits poor thermal stability.

Figure 2:
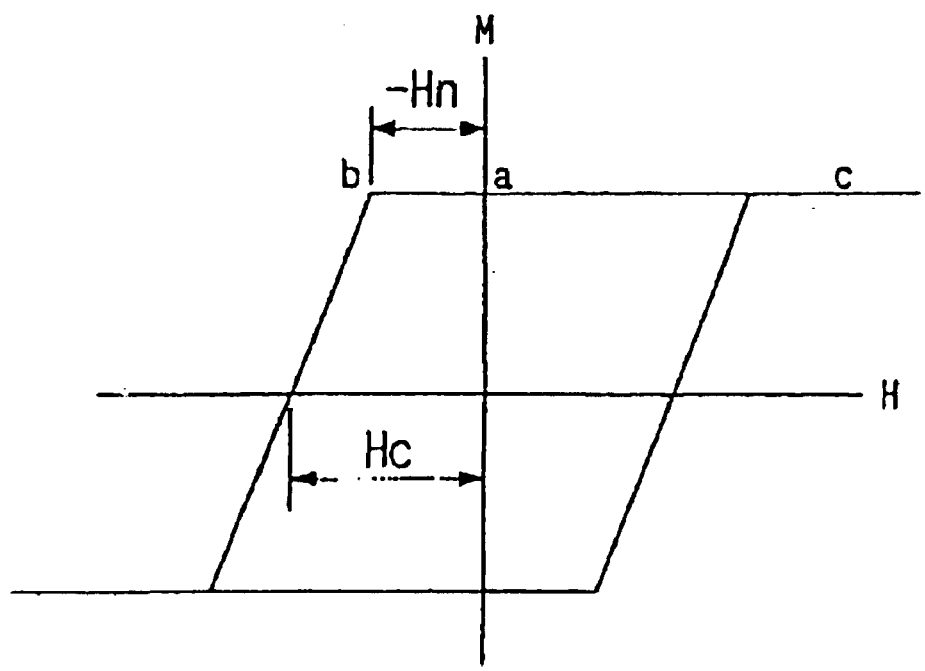
FIG. 2 shows an exemplary hysteresis loop.

As shown in FIG. 2, the nucleation field (−Hn) can be represented by the distance Oe between the Y axis and a point "b" shown in an MH loop obtained by use of, for example, a VSM. At a point "a" in the MH loop, the external magnetic field becomes zero when the external magnetic field is reduced after magnetization of the medium is saturated. The line tangent to the MH loop at a point b at which magnetization of the MH loop becomes zero intersects with a saturation magnetization line at the point "c".

Figure 3:
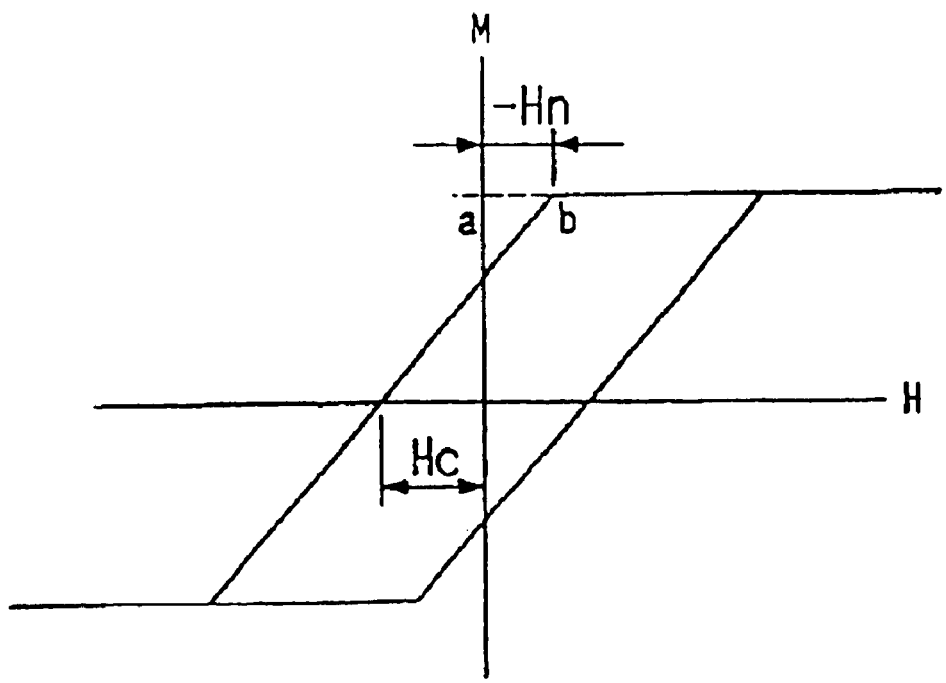
FIG. 3 shows another exemplary hysteresis loop.

When the point b is located within the region in which the external magnetic field is negative, the nucleation field (−Hn) becomes positive (see FIG. 2). In contrast, when the point b is located within the region in which the external magnetic field is positive, the nucleation field (−Hn) becomes negative (see FIG. 3).

As used herein, the expression "easy-magnetization axes are oriented generally perpendicular to the substrate" refers to the case where coercive force in a direction perpendicular to the substrate is larger than coercive force in a direction parallel to the substrate, the coercive forces being measured by use of, for example, a VSM.

The protective layer 6 is provided for preventing corrosion of the perpendicular magnetic layer 5, and for protecting the surface of the magnetic recording medium from any damage when a magnetic head is brought into contact with the medium. The protective layer 6 may be formed from a conventionally known material; for example, a material containing C, $SiO_2$, or $ZrO_2$.

From the viewpoint of high recording density, the thickness of the protective layer 6 is preferably 1 to 10 nm, since the distance between a magnetic head and the medium can be reduced.

The lubrication layer 7 is preferably formed from, for example, perfluoropolyether, fluorinated alcohol, or fluorinated carboxylic acid.

The magnetic recording medium of the present invention includes a non-magnetic substrate; an orientation-regulating layer for regulating the crystal orientation of a layer provided directly thereon; a perpendicular magnetic layer in which easy-magnetization axes are oriented generally perpendicular to the substrate; and a protective layer, the layers being formed on the substrate, wherein the perpendicular magnetic layer is formed from a material containing Co as a primary component and also containing at least Cr, Pt, and Nd, the ratio of residual magnetization (Mr) in a direction perpendicular to the substrate to saturation magnetization (Ms) in a direction perpendicular to the substrate; i.e., Mr/Ms, is at least 0.85, and activation magnetic moment represented by the product of activation volume and saturation magnetic moment is $0.3 \times 10^{-15}$ emu to $0.8 \times 10^{-15}$ emu. Therefore, without increasing noise of the magnetic recording medium during recording and reproduction of data, recording and reproducing characteristics, such as resolution, can be improved, and thermal stability of magnetization can be enhanced.

Next will be described an embodiment of the process for producing the magnetic recording medium having the aforementioned structure.

The magnetic recording medium having the aforementioned structure is produced as follows. Firstly, on the non-magnetic substrate 1, the soft magnetic undercoat layer 2, the orientation-regulating layer 3, the intermediate layer 4, and the perpendicular magnetic layer 5 are successively formed through, for example, sputtering, vacuum deposition, or ion plating. Subsequently, the protective layer 6 is formed by means of, preferably, plasma CVD, an ion-beam method, or sputtering.

The non-magnetic substrate 1 may be a metallic substrate formed from a metallic material such as aluminum or an aluminum alloy, or a non-metallic substrate formed from a non-metallic material such as glass, ceramic, silicon, silicon carbide, or carbon.

A glass substrate may be formed from amorphous glass or glass ceramic. Amorphous glass may be general-purpose glass, such as soda-lime glass, or aluminosilicate glass. Glass ceramic may be lithium-based glass ceramic. Meanwhile, a ceramic substrate may be formed from a general-purpose sintered compact predominantly containing aluminum oxide, aluminum nitride, and silicon nitride; or fiber-reinforced material thereof.

The non-magnetic substrate 1 may be any of metallic or non-metallic substrates coated with a NiP layer through plating or sputtering.

The average surface roughness (Ra) of the non-magnetic substrate is preferably 2 nm (20 Å) or less, more preferably 1 nm or less, since the flying height of a magnetic head can be reduced, and high recording density can be attained.

The micro-waviness (Wa) of the surface of the non-magnetic substrate is preferably 0.3 nm or less, more preferably 0.25 nm or less, so as to attain recording at high recording density under a reduced flying height of the magnetic head. From the viewpoint of flying stability of the magnetic head, the average surface roughness (Ra) of at least one of an edge portion and a side portion of a chamfer section of the end surface of the substrate is preferably 10 nm or less, more preferably 9.5 nm or less. The micro-waviness (Wa) can be obtained as an average surface roughness as measured within a measurement range of 80 μm by use of, for example, a surface roughness measurement apparatus P-12 (product of KLM-Tencor, USA).

If desired, the non-magnetic substrate is washed, and the resultant substrate is placed in a chamber of a film formation apparatus. If desired, the substrate is heated to 100 to 400° C. by use of, for example, a heater. On the non-magnetic substrate 1, the soft magnetic undercoat layer 2, the orientation-regulating layer 3, the intermediate layer 4, and the perpendicular magnetic layer 5 are formed through DC or RF magnetron sputtering by use of sputtering targets containing materials having the same compositions as the respective layers. Sputtering for forming the layers is carried out under, for example, the following conditions. The chamber employed for forming the layers is evacuated to $10^{-4}$ to $10^{-7}$ Pa. The substrate is placed in the chamber, a sputtering gas (e.g., Ar gas) is introduced into the chamber, and discharging is carried out, to thereby form the layers through sputtering. During sputtering, power to be applied is regulated to 0.2 to 2.0 kW. When the discharging time and the power to be applied are regulated, the layers can be formed to desired thicknesses.

The thickness of the soft magnetic undercoat layer 2 is preferably regulated to 50 to 400 nm by means of regulating the discharging time and the power to be applied.

When the soft magnetic undercoat layer 2 is formed, preferably, a sputtering target containing a soft magnetic material is employed, since the soft magnetic under coat layer is readily formed. Examples of the soft magnetic material include FeCo-based alloys (e.g., FeCo and FeCoV); FeNi-based alloys (e.g., FeNi, FeNiMo, FeNiCr, and FeNiSi); FeAl-based alloys (e.g., FeAl, FeAlSi, FeAlSiCr, FeAlSiTiRu, and FeAlO); FeCr-based alloys (e.g., FeCr, FeCrTi, and FeCrCu); FeTa-based alloys (e.g., FeTa, FeTaC, and FeTaN); FeMg-based alloys (e.g., FeMgO); FeZr-based alloys (e.g., FeZrN); FeC-based alloys; FeN-based alloys; FeSi-based alloys; FeP-based alloys; FeNb-based alloys; FeHf-based alloys; FeB-based alloys; and materials containing Fe in an amount of at least 60 at %, such as FeAlO, FeMgO, FeTaN, and FeZrN. Preferred examples include Co alloys containing Co in an amount of at least 80 at % and at least one element selected from among Zr, Nb, Ta, Cr, Mo, etc. and having an amorphous structure, such as CoZr-based alloys, CoZrNb-based alloys, CoZrTa-based alloys, CoZrCr-based alloys, and CoZrMo-based alloys.

The aforementioned target is an alloy target formed through a melting process, or a sintered alloy target.

After the soft magnetic undercoat layer 2 is formed, preferably, the surface of the layer 2 is subjected to oxidation. For example, the soft magnetic undercoat layer 2 may be exposed to an oxygen-containing atmosphere after formation thereof. Alternatively, oxygen may be introduced into a process for forming a portion near the surface of the soft magnetic undercoat layer 2.

After the soft magnetic undercoat layer 2 is formed, the orientation-regulating layer 3 is formed. The thickness of the orientation-regulating layer 3 is regulated to 0.5 to 40 nm (preferably 1 to 20 nm) by means of regulating the discharging time and the power to be applied. Examples of the sputtering target material employed for forming the orientation-regulating layer include Ru-based alloys, Ni-based alloys, and Co-based alloys.

After the orientation-regulating layer is formed, the magnetic layer having a thickness of 15 to 40 nm is formed through sputtering by use of a sputtering target containing the material of the magnetic layer. Examples of the sputtering target material include Co20Cr14Pt2Nd (Cr content: 20 at %, Pt content: 14 at %, Nd content: 2 at %), Co22Cr12Pt4Nd (Cr content: 22 at %, Pt content: 12 at %, Nd content: 4 at %), Co19Cr14Pt1B1Ta1Nd (Cr content: 19 at %, Pt content: 14 at %, B content: 1 at %, Ta content: 1 at %, Nd content: 1 at %), Co22Cr12Pt2B2Nd (Cr content: 22 at %, Pt content: 12 at %, B content: 2 at %, Nd content: 2 at %), CoCrPtNd-based alloys, CoCrPtBNd-based alloys, CoCrPtTaNd-based alloys, CoCrPtCuNd-based alloys, CoCrPtBCuNd-based alloys, CoCrPt-based alloys, CoCr-based alloys, CoCrPtB-based alloys, CoCrPtCu-based alloys, lamination materials containing Co-based alloys (e.g., CoCr, CoB, and Co—SiO2) and Pd-based alloys (e.g., PdB and Pd—SiO2), and combinations of amorphous materials (e.g., TbFeCo) and CoCrPtCu-based materials.

Employment of a sputtering target material containing, in addition to Cr, Pt, and Nd, at least one element selected from among B, Ta, and Cu is also preferred.

Sputtering for forming the perpendicular magnetic layer containing a material containing Co as a primary component and also containing at least Cr, Pt, and Nd(in which the ratio of residual magnetization (Mr) in a direction perpendicular to the substrate to saturation magnetization (Ms) in a direction perpendicular to the substrate; i.e., Mr/Ms, is at least 0.85, and activation magnetic moment represented by the product of activation volume and saturation magnetic moment is $0.3 \times 10^{-15}$ emu to $0.8 \times 10^{-15}$ emu) is carried out under, for example, the following conditions.

A target containing a material containing Co as a primary component and also containing at least Cr, Pt, and Nd is employed. A chamber employed for forming the perpendicular magnetic layer is evacuated to $10^{-4}$ to $10^{-7}$ Pa. The substrate is placed in the chamber, a sputtering gas (e.g., Ar gas) is introduced into the chamber, and discharging is carried out, to thereby form the layer through sputtering. During sputtering, power to be applied is regulated to 0. 2 to 2.0 kW. When the discharging time and the power to be applied are regulated, the layer can be formed to a desired thickness.

The pressure of the sputtering gas is preferably 3 to 20 Pa, more preferably 5 to 15 Pa.

When the intermediate layer is provided between the non-magnetic undercoat layer and the magnetic layer, a sputtering target containing a CoCr alloy (Cr content: 25 to 45 at %) serving as a raw material is preferably employed. Examples of the CoCr alloy include a CoCr alloy, a $CoCrX_1$ alloy, or a $CoX_1$ alloy (wherein X1 is one or more elements selected from among Pt, Ta, Zr, Ru, Nb, Cu, Re, Ni, Mn, Ge, Si, O, N, and B). In the case where the magnetic layer contains B, the intermediate layer is preferably formed through sputtering under conditions such that, in the vicinity of the boundary between the non-magnetic undercoat layer and the magnetic layer, the Cr concentration becomes 40 at % or less in a region in which the B concentration is at least 1 at %.

After the magnetic layer is formed, a protective film (e.g., a protective film containing carbon as a primary component) is formed through any known technique, such as sputtering, plasma CVD, or a combination thereof.

If desired, a fluorine-based lubricant, such as perfluoropolyether, is applied onto the protective film through, for example, dipping or spin coating, to thereby form a lubrication layer.

In the magnetic recording medium produced through the process of the present invention, the perpendicular magnetic layer is formed from a material containing Co as a primary component and also containing at least Cr, Pt, and Nd, the ratio of residual magnetization (Mr) in a direction perpendicular to the substrate to saturation magnetization (Ms) in a direction perpendicular to the substrate; i.e., Mr/Ms, is at least 0.85, and activation magnetic moment represented by the product of activation volume and saturation magnetic moment is $0.3 \times 10^{-15}$ emu to $0.8 \times 10^{-15}$ emu. Therefore, without increasing noise of the magnetic recording medium during recording and reproduction of data, recording and reproduction characteristics, such as resolution, can be improved, and thermal stability of magnetization can be enhanced.

The production process of the present invention employing the aforementioned sputtering target can easily produce the magnetic recording medium, wherein the perpendicular magnetic layer is formed from a material containing Co as a primary component and also containing at least Cr, Pt, and Nd, the ratio of residual magnetization (Mr) in a direction perpendicular to the substrate to saturation magnetization (Ms) in a direction perpendicular to the substrate; i.e., Mr/Ms, is at least 0.85, and activation magnetic moment represented by the product of activation volume and saturation magnetic moment is $0.3 \times 10^{-15}$ emu to $0.8 \times 10^{-15}$ emu.

Figure 5:
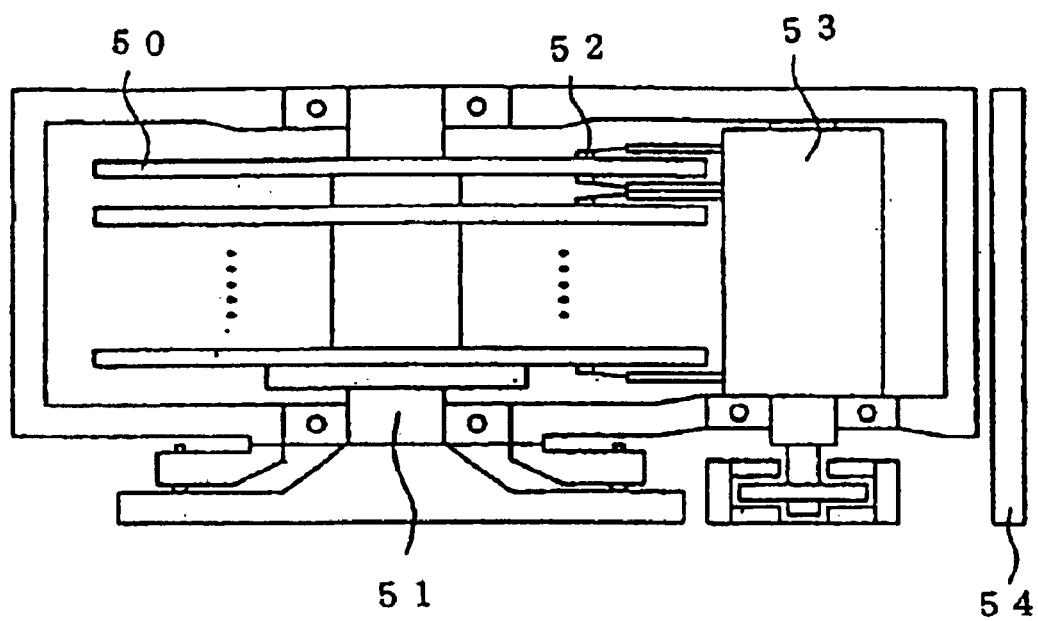
FIG. 5 is a schematic representation showing an embodiment of the magnetic recording and reproducing apparatus including the magnetic recording medium of the present invention.

FIG. 5 shows an embodiment of the magnetic recording and reproducing apparatus including the aforementioned magnetic recording medium. The magnetic recording and reproducing apparatus shown in FIG. 5 includes a magnetic recording medium 50 having a structure as shown in FIG. 1; a medium-driving section 51 which rotates the medium 50; a magnetic head 52 which is employed for recording of data onto the medium 50 and for reproduction of the data therefrom; a head-driving section 53 which drives the magnetic head 52 relative to the magnetic recording medium 50; and a recorded/reproduced-signal-processing system 54. In the recorded/reproduced-signal-processing system 54, input data are processed and recording signals are sent to the magnetic head 52, or reproduction signals from the head 52 are processed and the resultant data are output. The magnetic recording and reproducing apparatus of the present invention may employ, as the magnetic head 52, a head suitable for high recording density containing, for example, a giant magnetoresistive (GMR) element serving as a reproduction element.

The aforementioned magnetic recording and reproducing apparatus includes the magnetic recording medium, wherein the perpendicular magnetic layer is formed from a material containing Co as a primary component and also containing at least Cr, Pt, and Nd, the ratio of residual magnetization (Mr) in a direction perpendicular to the substrate to saturation magnetization (Ms) in a direction perpendicular to the substrate; i.e., Mr/Ms, is at least 0.85, and activation magnetic moment represented by the product of activation volume and saturation magnetic moment is $0.3 \times 10^{-15}$ emu to $0.8 \times 10^{-15}$ emu. Therefore, without increasing noise of the magnetic recording medium during recording and reproduction of data, recording and reproduction characteristics, such as resolution, can be improved, and thermal stability of magnetization can be enhanced. That is, the magnetic recording and reproducing apparatus is suitable for attaining high recording density.

Figure 4:
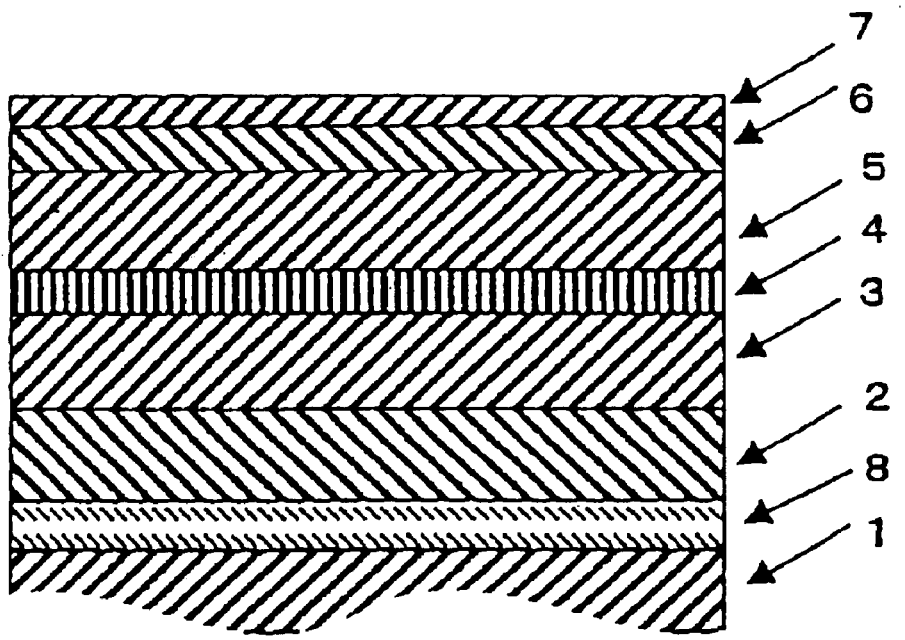
FIG. 4 is a cross-sectional view showing a second embodiment of the magnetic recording medium of the present invention.

FIG. 4 shows a second embodiment of the magnetic recording medium of the present invention. A hard magnetic layer 8 in which magnetic anisotropy is generally in a longitudinal direction may be provided between a non-magnetic substrate 1 and a soft magnetic undercoat layer 2.

The material employed for forming the hard magnetic layer 8 is preferably a CoSm alloy or a $CoCrPtX_2$ alloy ($X_2$ is one or more elements selected from among Pt, Ta, Zr, Nb, Cu, Re, Ni, Mn, Ge, Si, O, N, and B).

The coercive force (Hc) of the hard magnetic layer 8 is preferably at least 500 Oe, more preferably at least 1,000 Oe.

The thickness of the hard magnetic layer 8 is preferably 150 nm or less, more preferably 70 nm or less. When the thickness of the hard magnetic layer 8 exceeds 150 nm, the average surface roughness (Ra) of an orientation-regulating layer 3 becomes large.

Preferably, exchange coupling is established between the hard magnetic layer 8 and the soft magnetic undercoat layer 2, and the hard magnetic layer has a magnetization direction along a radial direction of the substrate. As a result, the soft magnetic layer 2 is magnetized in a radial direction by virtue of the exchange coupling, and the magnetization direction orthogonally crosses a magnetic field during recording of data by use of a magnetic head. Therefore, more stabilized exchange coupling can be realized during recording and reproduction of data. As a result, generation of noise can be prevented.

When the hard magnetic layer 8 is provided, formation of large magnetic domains in the soft magnetic undercoat layer 2 can be prevented more effectively. Therefore, generation of spike noise caused by formation of magnetic domain walls can be prevented, and error rate during recording and reproduction of data can be sufficiently lowered.

In order to regulate the crystal orientation of the hard magnetic layer 8, a Cr alloy material or a B2-structure material may be provided between the non-magnetic substrate 1 and the hard magnetic layer 8.

The magnetic recording medium having the aforementioned structure is produced as follows: firstly the hard magnetic layer 8 is formed on the substrate 1; thereafter the soft magnetic undercoat layer 2 is formed through, for example, sputtering; thereafter, if desired, the surface of the soft magnetic undercoat layer 2 is subjected to oxidation treatment; an orientation-regulating layer 3, an intermediate layer 4, and a perpendicular magnetic layer 5 are subsequently formed through, for example, sputtering; a protective layer 6 is subsequently formed through, for example, CVD, an ion-beam method, or sputtering; and a lubrication layer 7 is subsequently formed through, for example, dipping or spin coating.

A hard magnetic layer may be formed through, for example, a conventional method for forming a longitudinal isotropic medium. For example, a magnetic recording medium having a structure of glass substrate/NiAl alloy layer/CrMo alloy layer/CoCr alloy layer/CoCrPtB alloy layer is formed. Subsequently, a magnetic field in a radial direction is applied to the magnetic recording medium including a protective layer, to thereby magnetize a hard magnetic layer in a radial direction. Preferably, the magnetic field is applied to the medium such that magnetization of the hard magnetic layer is sufficiently saturated; for example, a magnetic field of at least 790,000 A/m (10,000 Oe) is applied.

Functions and effects of the present invention will next be described in detail by way of Examples, which should not be construed as limiting the invention thereto. Unless indicated otherwise herein, all parts are by atomic %.

EXAMPLE 1

A glass substrate (product of Ohara Inc., Japan, outer diameter: 2.5 inches), which had been washed, was placed in a film formation chamber of a DC magnetron sputtering apparatus (Model: C-3010, product of ANELVA, Japan), and the chamber was evacuated to $1 \times 10^{-5}$ Pa. Thereafter, while the temperature of the substrate was maintained at 100° C. or less, a soft magnetic undercoat layer 2 (thickness: 100 nm) was formed on the glass substrate through sputtering by use of an 89Co4Zr7Nb (Co content: 89 at %, Zr content: 4 at %, Nb content: 7 at %) target. The product of the saturated magnetic flux density Bs (T) and thickness t (nm) of the layer 2; i.e., Bs·t (T·nm), was measured by use of a vibrating sample magnetometer (VSM), and was found to be 120 (T·nm).

Subsequently, the substrate was heated to 200° C., and an orientation-regulating layer 3 (thickness: 20 nm) was formed on the aforementioned soft magnetic undercoat layer 2 by use of an Ru target. Subsequently, an intermediate layer 4 (thickness: 5 nm) was formed by use of a 65Co30Cr5B (Co content: 65 at %, Cr content: 30 at %, B content: 5 at %) target, and then a perpendicular magnetic layer 5 (thickness: 20 nm) was formed by use of a 68Co18Cr10Pt4Nd (Co content: 68 at %, Cr content: 18 at %, Pt content: 10 at %, Nd content: 4 at %) target. In the aforementioned sputtering processes, argon was employed as a film formation sputtering gas, and the layers were formed at a pressure of 0.6 Pa.

Subsequently, a protective layer 6 (thickness: 5 nm) was formed through CVD. Subsequently, a lubrication layer 7 containing perfluoropolyether was formed through dipping, to thereby produce a magnetic recording medium.

EXAMPLES 2 THROUGH 11

The procedure of Example 1 was repeated, except that the perpendicular magnetic layer 5 was changed in its composition and thickness, to thereby produce magnetic recording media.

Comparative Example 1

A glass substrate (product of Ohara Inc., outer diameter: 2.5 inches), which had been washed, was placed in a film formation chamber of a DC magnetron sputtering apparatus (Model: C-3010, product of ANELVA), and the chamber was evacuated to $1 \times 10^{-5}$ Pa. Thereafter, while the temperature of the substrate was maintained at 100° C. or less, a soft magnetic undercoat layer 2 (thickness: 100 nm) was formed on the glass substrate through sputtering by use of an 89Co4Zr7Nb target. The product of the saturated magnetic flux density Bs (T) and thickness t (nm) of the layer 2; i.e., Bs·t (T·nm), was measured by use of a vibrating sample magnetometer (VSM), and was found to be 120 (T·nm).

Subsequently, the substrate was heated to 200° C., and an orientation-regulating layer 3 (thickness: 20 nm) was formed on the aforementioned soft magnetic undercoat layer by use of an Ru target. Subsequently, an intermediate layer 4 (thickness: 5 nm) was formed by use of a 65Co30Cr5B target, and then a perpendicular magnetic layer 5 (thickness: 20 nm) was formed by use of a 72Co18Cr10Pt target. In the aforementioned sputtering processes, argon was employed as a film formation sputtering gas, and the layers were formed at a pressure of 0.6 Pa.

Subsequently, a protective layer 6 (thickness: 5 nm) was formed through CVD. Subsequently, a lubrication layer 7 containing perfluoropolyether was formed through dipping, to thereby produce a magnetic recording medium.

Comparative Examples 2 Through 12

The procedure of Comparative Example 1 was repeated, except that the perpendicular magnetic layer 5 was changed in its composition and thickness, to thereby produce magnetic recording media.

Magnetic characteristics of each of the magnetic recording media of Examples 1 through 11 and Comparative formed at a track-recording density of 500 kFCI by use of a complex-type thin film magnetic recording head containing a giant magnetoresistive (GMR) element at the reproduction portion.

In order to evaluate thermal stability (thermal decay), a signal was recorded onto the magnetic recording medium by use of a spin stand S1701MP at 70° C. and a track-recording density of 50 kFCl, and percent reduction of reproduction output (%/decade) on the basis of reproduction output one second after signal recording was calculated by use of the following formula: $(So-S) \times 100/(So \times 3)$ (wherein So represents reproduction output one second after recording of a signal onto the magnetic recording medium, and S represents reproduction output 1,000 seconds after recording of the signal). The results are shown in Table 2.

TABLE 2

| | Perpendicular magnetic layer | | Magnetic characteristics | | | Activation magnetic moment [×10$^{-15}$ emu] | Nucleation field [Oe] | Read-write characteristics | | Thermal decay [%/decade] |
|---|---|---|---|---|---|---|---|---|---|---|
| | Composition [at %] | Thickness [nm] | Hc-v [Oe] | Mr/Ms | Hc-v/Hc-i | | | PW50 [ns] | SNR [dB] | |
| Ex. 1 | Co18Cr10Pt4Nd | 20 | 4150 | 1.00 | 8 | 0.60 | 500 | 10.2 | 18.96 | 0.35 |
| Ex. 2 | Co20Cr10Pt4Nd | 20 | 3800 | 1.00 | 7 | 0.57 | 200 | 10.3 | 19.04 | 0.42 |
| Ex. 3 | Co23Cr10Pt4Nd | 20 | 3550 | 1.00 | 6 | 0.53 | 150 | 10.5 | 19.07 | 0.44 |
| Ex. 4 | Co28Cr10Pt4Nd | 20 | 3400 | 0.95 | 6 | 0.51 | 100 | 11.0 | 19.37 | 0.44 |
| Ex. 5 | Co18Cr20Pt4Nd | 20 | 4700 | 1.00 | 8 | 0.65 | 1,300 | 10.1 | 18.60 | 0.17 |
| Ex. 6 | Co28Cr20Pt4Nd | 20 | 3800 | 0.95 | 6 | 0.56 | 300 | 10.9 | 19.22 | 0.39 |
| Ex. 7 | Co22Cr14Pt2Nd | 20 | 3400 | 1.00 | 7 | 0.55 | 200 | 10.4 | 18.98 | 0.42 |
| Ex. 8 | Co22Cr14Pt5Nd | 20 | 4000 | 1.00 | 8 | 0.59 | 600 | 10.2 | 18.89 | 0.33 |
| Ex. 9 | Co22Cr14Pt8Nd | 20 | 4700 | 1.00 | 8 | 0.65 | 1,000 | 10.1 | 18.75 | 0.23 |
| Ex. 10 | Co22Cr14Pt2Nd | 10 | 3300 | 0.92 | 6 | 0.45 | 0 | 10.8 | 19.56 | 0.46 |
| Ex. 11 | Co22Cr14Pt2Nd | 40 | 4400 | 1.00 | 7 | 0.70 | 1,500 | 11.2 | 18.75 | 0.14 |
| Comp. Ex. 1 | Co18Cr10Pt | 20 | 2700 | 0.70 | 3 | 0.55 | -600 | 15.0 | 17.00 | 0.96 |
| Comp. Ex. 2 | Co18Cr14Pt | 20 | 3400 | 0.75 | 3 | 0.70 | -200 | 14.0 | 16.19 | 0.76 |
| Comp. Ex. 3 | Co18Cr16Pt | 20 | 3800 | 0.85 | 3 | 0.85 | 0 | 12.4 | 15.21 | 0.68 |
| Comp. Ex. 4 | Co18Cr20Pt | 20 | 3600 | 0.92 | 3 | 0.90 | 500 | 11.6 | 14.39 | 0.54 |
| Comp. Ex. 5 | Co18Cr24Pt | 20 | 3500 | 1.00 | 3 | 1.05 | 1,000 | 10.7 | 13.52 | 0.42 |
| Comp. Ex. 6 | Co32Cr14Pt4Nd | 20 | 2500 | 0.80 | 4 | 0.45 | -1,200 | 13.2 | 16.82 | 1.17 |
| Comp. Ex. 7 | Co16Cr14Pt4Nd | 20 | 4200 | 1.00 | 9 | 0.75 | 2,000 | 10.1 | 17.94 | 0.10 |
| Comp. Ex. 8 | Co22Cr14Pt12Nd | 20 | 4500 | 1.00 | 4 | 0.75 | 1,000 | 10.6 | 17.90 | 0.38 |
| Comp. Ex. 9 | Co18Cr8Pt4Nd | 20 | 2500 | 0.63 | 2 | 0.62 | -1,000 | 16.7 | 18.65 | 1.96 |
| Comp. Ex. 10 | Co18Cr24Pt4Nd | 20 | 2800 | 1.00 | 3 | 0.80 | 1,200 | 10.8 | 17.47 | 0.63 |
| Comp. Ex. 11 | Co18Cr | 40 | 1000 | 0.53 | 2 | 1.10 | -1,500 | 20.8 | 16.65 | 2.68 |
| Comp. Ex. 12 | Co18Cr5Nd | 40 | 1200 | 0.53 | 2 | 1.15 | -1,400 | 20.8 | 16.63 | 2.57 |

Note) Hc-v/Hc-i ratio was evaluated by use of a sample including no CoCrZr soft magnetic undercoat layer.

Examples 1 through 12 were measured by use of a vibrating sample magnetometer (VSM). The ratio of coercive force (Hc-v) in a perpendicular direction to coercive force (Hc-i) in a longitudinal direction; i.e., (Hc-v)/(Hc-i), was evaluated as follows. A sample including no soft magnetic undercoat layer was prepared separately; (Hc-v) was measured under application of a magnetic field in a direction perpendicular to the substrate; (Hc-i) was measured under application of a magnetic field in a direction parallel to the substrate and in a circumferential or radial direction; and the ratio of (Hc-v)/(Hc-i) was calculated.

Time-dependent data of coercive force in a perpendicular direction were obtained by use of a vibrating sample magnetometer, and on the basis of the resultant data, vlsb was calculated by use of the aforementioned equation.

Recording and reproduction characteristics were measured by use of read/write analyzer RWA1632 and spin stand S1701MP (products of GUZIK, USA). In order to evaluate read-write conversion characteristics, measurement was per- As is clear from Table 2, when the perpendicular magnetic layer 5 is formed from a magnetic material containing Nd, an increase in vlsb is suppressed and Mr/Ms ratio, (Hc-v)/(Hc-i), and −Hn are improved, and thus resolution, S/N ratio, and thermal stability during recording and reproduction of data are improved. Mr/Ms ratio, (Hc-v)/(Hc-i), and −Hn of the magnetic recording medium of Example 1 including the perpendicular magnetic layer containing Nd are improved as compared with those of the magnetic recording medium of Comparative Example 1 including the perpendicular magnetic layer containing no Nd. The results show that, in the magnetic recording media of Comparative Examples 1 through 5 in which the Pt content is increased up to 20 at % in order to obtain magnetic characteristics comparable to those of the magnetic recording medium of Example 1, vlsb increases in accordance with an increase in the Pt content, and thus S/N ratio is lowered during recording and reproduction of data. As is clear from the results of Examples 7 through 9, when the Nd content is increased, while an increase in vlsb is suppressed, Mr/Ms ratio, (Hc-v)/(Hc-i), and −Hn are further improved. The results show that magnetic characteristics of the magnetic recording medium are effectively improved by incorporating Nd, rather than by increasing the Pt content. As is clear from the results of Comparative Examples 6 through 8, when the Cr content falls outside the range of 18 to 28 at %, or when the Nd content exceeds 8 at %, Mr/Ms ratio and thermal stability are lowered, vlsb increases, and S/N ratio is lowered during recording and reproduction of data. As is clear from the results of Comparative Example 9, when the Pt content is less than 10 at %, incorporated Nd exerts virtually no effect. As is clear from the results of Comparative Example 10, when the Pt content exceeds 20 at %, magnetic characteristics are drastically deteriorated.

Comparative Examples 13 and 14

The procedure of Comparative Example 1 was repeated, except that the composition of the perpendicular magnetic layer 5 was changed, to thereby produce magnetic recording media. Magnetic characteristics, (Hc-v)/(Hc-i), and vlsb of each of the magnetic recording media of Examples 12 through 16 and Comparative Examples 13 and 14 were measured and evaluated in a manner similar to that of Example 1.

The results are shown in Table 3.

TABLE 3

| | Perpendicular magnetic layer | | Magnetic characteristics | | Activation magnetic | Nucleation |
|---|---|---|---|---|---|---|
| | Composition [at %] | Thickness [nm] | Hc-v [Oe] | Mr/Ms | Hc-v/ Hc-i | moment [×10$^{-15}$ emu] | field [Oe] |
| Ex. 12 | Co22Cr14Pt2B4Nd | 20 | 3,600 | 1 | 8 | 0.56 | 500 |
| Ex. 13 | Co22Cr14Pt8B4Nd | 20 | 3,400 | 0.9 | 6 | 0.49 | 100 |
| Ex. 14 | Co22Cr14Pt4Ta4Nd | 20 | 3,500 | 1 | 6 | 0.53 | 150 |
| Ex. 15 | Co22Cr14Pt2Cu4Nd | 20 | 3,800 | 1 | 9 | 0.55 | 600 |
| Ex. 16 | Co22Cr14Pt2B2Cu4Nd | 20 | 4,000 | 1 | 8 | 0.52 | 500 |
| Comp. Ex. 13 | Co22Cr14Pt12B4Nd | 20 | 3,700 | 0.8 | 4 | 0.40 | −200 |
| Comp. Ex. 14 | Co22Cr14Pt6B4Ta4Nd | 20 | 3,200 | 0.75 | 4 | 0.50 | −600 |

Note) Hc-v/Hc-i ratio was evaluated by use of a sample including no CoCrZr soft magnetic undercoat layer.

EXAMPLE 12

A glass substrate (product of Ohara Inc., outer diameter: 2.5 inches), which had been washed, was placed in a film formation chamber of a DC magnetron sputtering apparatus (Model: C-3010, product of ANELVA), and the chamber was evacuated to 1×10$^{-5}$ Pa. Thereafter, while the temperature of the substrate was maintained at 100° C. or less, a soft magnetic undercoat layer 2 (thickness: 100 nm) was formed on the glass substrate through sputtering by use of an 89Co4Zr7Nb target. The product of the saturated magnetic flux density Bs (T) and thickness t (nm) of the layer 2; i.e., Bs·t (T·nm), was measured by use of a vibrating sample magnetometer (VSM), and was found to be 120 (T·nm).

Subsequently, the substrate was heated to 200° C., and an orientation-regulating layer 3 (thickness: 20 nm) was formed on the aforementioned soft magnetic undercoat layer by use of an Ru target. Subsequently, an intermediate layer 4 (thickness: 5 nm) was formed by use of a 65Co30Cr5B target, and then a perpendicular magnetic layer 5 (thickness: 20 nm) was formed by use of a 58Co22Cr14Pt2B4Nd target. In the aforementioned sputtering processes, argon was employed as a film formation sputtering gas, and the layers were formed at a pressure of 0.6 Pa.

Subsequently, a protective layer 6 (thickness: 5 nm) was formed through CVD. Subsequently, a lubrication layer 7 containing perfluoropolyether was formed through dipping, to thereby produce a magnetic recording medium.

EXAMPLES 13 THROUGH 16

The procedure of Example 12 was repeated, except that the perpendicular magnetic layer 5 was changed in its composition, to thereby produce magnetic recording media.

The results in Table 3 show that when the perpendicular magnetic layer 5 is formed from a magnetic material containing Nd and Cu, B, or Ta, magnetic characteristics are regulated. Meanwhile, as is clear from the results of Comparative Examples 13 and 14, when the total amount of Cu, B, and Ta exceeds 8 at %, magnetic characteristics are deteriorated.

EXAMPLE 17

A glass substrate (product of Ohara Inc., outer diameter: 2.5 inches), which had been washed, was placed in a film formation chamber of a DC magnetron sputtering apparatus (Model: C-3010, product of ANELVA), and the chamber was evacuated to 1×10$^{-5}$ Pa. Thereafter, while the temperature of the substrate was maintained at 100° C. or less, a soft magnetic undercoat layer 2 (thickness: 100 nm) was formed on the glass substrate through sputtering by use of an 89Co4Zr7Nb target. The product of the saturated magnetic flux density Bs (T) and thickness t (nm) of the layer 2; i.e., Bs·t (T·nm), was measured by use of a vibrating sample magnetometer (VSM), and was found to be 120 (T·nm).

Subsequently, the surface of the soft magnetic undercoat layer 2 was exposed to a gas mixture of 50% oxygen and argon at a pressure of 1 Pa for 10 seconds.

Subsequently, the substrate was heated to 200° C., and an orientation-regulating layer 3 (thickness: 20 nm) was formed on the aforementioned soft magnetic undercoat layer by use of an Ru target, and then an intermediate layer 4 (thickness: 5 nm) was formed by use of a 65Co30Cr5B target. Subsequently, a first perpendicular magnetic layer 51 (thickness: 15 nm) was formed by use of a 63Co18Cr14Pt target, and then a second perpendicular magnetic layer 52 (thickness: 5 nm) was formed by use of a 59Co22Cr14Pt5Nd target. In the aforementioned sputtering processes, argon was employed as a film formation sputtering gas, and the layers were formed at a pressure of 0.6 Pa.

Subsequently, a protective layer 6 (thickness: 5 nm) was formed through CVD. Subsequently, a lubrication layer 7 containing perfluoropolyether was formed through dipping, to thereby produce a magnetic recording medium.

EXAMPLES 18 and 19

The procedure of Example 17 was repeated, except that the composition of the first perpendicular magnetic layer 51 was changed as shown in Table 4, to thereby produce magnetic recording media.

Magnetic characteristics, (Hc-v)/(Hc-i), and vIsb of each of the magnetic recording media of Examples 17, 18, and 19 were measured and evaluated in a manner similar to that of Example 1.

The results are shown in Table 4.

Subsequently, the surface of the soft magnetic undercoat layer 2 was exposed to a gas mixture of 50% oxygen and argon at a pressure of 1 Pa for 10 seconds.

Subsequently, the substrate was heated to 200° C., and an orientation-regulating layer 3 (thickness: 20 nm) was formed on the aforementioned soft magnetic undercoat layer by use of an Ru target. Subsequently, an intermediate layer 4 (thickness: 5 nm) was formed by use of a 65Co30Cr5B target, and then a perpendicular magnetic layer 5 (thickness: 20 nm) was formed by use of a 59Co22Cr14Pt5Nd target. In the aforementioned sputtering processes, argon was employed as a film formation sputtering gas, and the layers were formed at a pressure of 0.6 Pa. Subsequently, a protective layer 6 (thickness: 5 nm) was formed through CVD. Subsequently, a lubrication layer 7 containing perfluoropolyether was formed through dipping, to thereby

TABLE 4

|  | Perpendicular magnetic layer 51 | | Perpendicular magnetic layer 52 | | Magnetic characteristics | | | Activation magnetic | Nucleation |
| --- | --- | --- | --- | --- | --- | --- | --- | --- | --- |
|  | Composition [at %] | Thickness [nm] | Composition [at %] | Thickness [nm] | Hc-v [Oe] | Mr/Ms | Hc-v/ Hc-i | moment [×10$^{-15}$ emu] | field [Oe] |
| Ex. 8 | — | — | Co22Cr14Pt5Nd | 20 | 4,000 | 1.00 | 8 | 0.59 | 600 |
| Ex. 17 | Co18Cr14Pt | 15 | Co22Cr14Pt5Nd | 5 | 3,600 | 0.95 | 6 | 0.57 | 200 |
| Ex. 18 | Co18Cr10Pt | 15 | Co22Cr14Pt5Nd | 5 | 3,800 | 1.00 | 6 | 0.62 | 300 |
| Ex. 19 | Co18Cr14Pt2B | 15 | Co22Cr14Pt5Nd | 5 | 3,950 | 1.00 | 6 | 0.59 | 350 |
| Comp. Ex. 1 | Co18Cr10Pt | 20 | — | — | 2,700 | 0.70 | 3 | 0.55 | −600 |
| Comp. Ex. 2 | Co18Cr14Pt | 20 | — | — | 3,400 | 0.75 | 3 | 0.70 | −200 |

Note) Hc-v/Hc-i ratio was evaluated by use of a sample including no soft magnetic undercoat layer.

The results in Table 4 show that when a plurality of the perpendicular magnetic layers 5 are provided, and one of the layers is formed from a magnetic material containing Nd, magnetic characteristics are improved.

EXAMPLE 20

A glass substrate (product of Ohara Inc., outer diameter: 2.5 inches), which had been washed, was placed in a film formation chamber of a DC magnetron sputtering apparatus (Model: C-3010, product of ANELVA), and the chamber was evacuated to 1×10$^{-5}$ Pa. Thereafter, a 94Cr6Mo layer (thickness: 20 nm) was formed on the glass substrate for regulating the crystal orientation of a hard magnetic layer 8. Subsequently, a hard magnetic layer 8 (thickness: 50 nm) was formed from Co20Cr14Pt4B. Thereafter, while the temperature of the substrate was maintained at 100° C. or less, a soft magnetic undercoat layer 2 (thickness: 100 nm) was formed through sputtering by use of an 89Co4Zr7Nb target. The product of the saturated magnetic flux density Bs (T) and thickness t (nm) of the layer 2; i.e., Bs·t (T·nm), was measured by use of a vibrating sample magnetometer (VSM), and found to be 120 (T·nm).

produce a magnetic recording medium. A voltage of 200 V was applied to a magnetization jig which is exclusively employed for a magnetic recording medium and which generates a pulse magnetic field having a half width on the order of 10 msec, and a pulse magnetic field having an intensity of 948 kA /m (11,850 Oe) was applied to the above-produced magnetic recording medium in a radial direction, to thereby magnetize the medium in a radial direction.

EXAMPLES 21 THROUGH 24

The procedure of Example 20 was repeated, except that the hard magnetic layer was changed in its composition and thickness, to thereby produce magnetic recording media. Magnetic characteristics, (Hc-v)/(Hc-i), and vIsb of each of the magnetic recording media of Examples 20 through 24 were measured and evaluated in a manner similar to that of Example 1.

The results are shown in Table 5.

TABLE 5

|  | Hard magnetic layer | | Magnetic characteristics | | | Activation magnetic | Nucleation |
| --- | --- | --- | --- | --- | --- | --- | --- |
|  | Composition [at %] | Thickness [nm] | Hc-v [Oe] | Mr/Ms | Hc-v/Hc-i | moment [×10$^{-15}$ emu] | field [Oe] |
| Ex. 8 | — | — | 4,000 | 1 | 8 | 0.59 | 600 |
| Ex. 20 | Co20Cr14Pt4B | 50 | 4,100 | 1 | 8 | 0.60 | 600 |
| Ex. 21 | Co20Cr14Pt4B | 20 | 4,050 | 1 | 8 | 0.60 | 600 |
| Ex. 22 | Co20Cr14Pt4B | 150 | 4,200 | 1 | 8 | 0.60 | 600 |

TABLE 5-continued

| | Hard magnetic layer | | Magnetic characteristics | | | Activation magnetic moment [×10⁻¹⁵ emu] | Nucleation field [Oe] |
|---|---|---|---|---|---|---|---|
| | Composition [at %] | Thickness [nm] | Hc-v [Oe] | Mr/Ms | Hc-v/Hc-i | | |
| Ex. 23 | Co17Cr22Pt | 50 | 4,000 | 1 | 8 | 0.60 | 600 |
| Ex. 24 | Co16Sm | 50 | 3,900 | 1 | 8 | 0.62 | 600 |

Note) Hc-v/Hc-i ratio was evaluated by use of a sample including no hard magnetic layer and soft magnetic under coat layer.

The results in Table 5 show that when the hard magnetic layer 8 is formed from the aforementioned material, magnetic characteristics are improved.

EXAMPLE 25

A glass substrate (product of Ohara Inc., outer diameter: 2.5 inches), which had been washed, was placed in a film formation chamber of a DC magnetron sputtering apparatus (Model: C-3010, product of ANELVA), and the chamber was evacuated to $1\times10^{-5}$ Pa. Thereafter, while the temperature of the substrate was maintained at 100° C. or less, a soft magnetic undercoat layer 2 (thickness: 100 nm) was formed on the glass substrate through sputtering by use of an 89Co4Zr7Nb target. The product of the saturated magnetic flux density Bs (T) and thickness t (nm) of the layer 2; i.e., Bs·t (T·nm), was measured by use of a vibrating sample magnetometer (VSM), and was found to be 120 (T·nm). Subsequently, the substrate was heated to 200° C., and an orientation-regulating layer 3 (thickness: 20 nm) was formed on the aforementioned soft magnetic undercoat layer by use of an Ru target. Subsequently, an intermediate layer 4 (thickness: 5 nm) was formed by use of a 65Co30Cr5B target, and then a perpendicular magnetic layer 5 (thickness: 20 nm) was formed by use of a 59Co22Cr14Pt5Nd target. In the sputtering process for forming the perpendicular magnetic layer 5, argon was employed as a film formation sputtering gas, and the layer 5 was formed at a pressure of 3 Pa. In the sputtering process for forming the layers other than the layer 5, the layers were formed at a pressure of 0.6 Pa. Subsequently, a protective layer 6 (thickness: 5 nm) was formed through CVD. Subsequently, a lubrication layer 7 containing perfluoropolyether was formed through dipping, to thereby produce a magnetic recording medium.

EXAMPLES 26 THROUGH 28

The procedure of Example 25 was repeated, except that the film formation pressure of the perpendicular magnetic layer 5 was changed, to thereby produce magnetic recording media. Magnetic characteristics, (Hc-v)/(Hc-i), and vlsb of each of the magnetic recording media of Examples 25 through 28 were measured and evaluated in a manner similar to that of Example 1.

The results are shown in Table 6.

TABLE 6

| | Hard magnetic layer | | Magnetic characteristics | | | Activation magnetic moment [×10⁻¹⁵ emu] | Nucleation field [Oe] |
|---|---|---|---|---|---|---|---|
| | Composition [at %] | Film formation pressure [Pa] | Hc-v [Oe] | Mr/Ms | Hc-v/Hc-i | | |
| Ex. 8 | Co22Cr14Pt5Nd | 0.5 | 4,000 | 1.00 | 8 | 0.59 | 600 |
| Ex. 25 | Co22Cr14Pt5Nd | 3 | 4,000 | 1.00 | 8 | 0.51 | 500 |
| Ex. 26 | Co22Cr14Pt5Nd | 10 | 3,950 | 1.00 | 7 | 0.48 | 400 |
| Ex. 27 | Co22Cr14Pt5Nd | 20 | 3,900 | 0.95 | 6 | 0.46 | 200 |
| Ex. 28 | Co22Cr14Pt5Nd | 25 | 3,400 | 0.80 | 4 | 0.46 | −150 |

Note) Hc-v/Hc-i ratio was evaluated by use of a sample including no soft magnetic undercoat layer.

The results in Table 6 show that when the pressure of sputtering gas is increased during formation of the perpendicular magnetic layer 5, vlsb is further reduced without deterioration of other characteristics. As is clear from the results of Example 28, when the film formation pressure exceeds 20 Pa, magnetic characteristics are deteriorated.

As described above, in the magnetic recording medium of the present invention, since the perpendicular magnetic layer is formed from a material containing Co as a primary component and also containing at least Cr, Pt, and Nd, magnetic characteristics can be improved without deteriorating recording and reproduction characteristics. Furthermore, since magnetic characteristics of the medium can be improved by regulating the Nd content instead of the Pt content, the Pt content of the perpendicular magnetic layer can be reduced, and thus an increase in production cost of the medium can be suppressed.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising, in order, a non-magnetic substrate; an orientation-regulating layer for regulating the crystal orientation of a layer provided directly thereon; a perpendicular magnetic layer in which easy-magnetization axes are oriented generally perpendicular to the substrate; and a protective layer;

and wherein the perpendicular magnetic layer is formed from a material containing Co as a primary component and at least Cr, Pt, and Nd, a ratio of residual magnetization (Mr) in a direction perpendicular to the substrate to saturation magnetization (Ms) in a direction perpendicular to the substrate is at least 0.85, and an activation magnetic moment represented by the product of activation volume and saturation magnetic moment is $0.3 \times 10^{-15}$ emu to $0.8 \times 10^{-15}$ emu.

2. A magnetic recording medium according to claim 1, wherein a coercive force in a direction perpendicular to the substrate is at least 2,500 Oe, and a ratio of the coercive force (Hc-v) in a direction perpendicular to the substrate to the coercive force (Hc-i) in a direction parallel to the substrate is at least 5.

3. A magnetic recording medium according to claim 1 or 2, wherein a nucleation field in a direction perpendicular to the substrate is 0 to 2,000 Oe.

4. A magnetic recording medium according to claim 1 or 2, wherein the perpendicular magnetic layer is formed from a material containing Cr in an amount of 18 to 28 at %, Pt in an amount of 10 to 20 at %, and Nd in an amount of 0.5 to 8 at %.

5. A magnetic recording medium according to claim 1 or 2, wherein the perpendicular magnetic layer is formed from a material further containing at least one element selected from the group consisting of B, Ta, and Cu, in which the total amount of these elements is 8 at % or less.

6. A magnetic recording medium comprising a perpendicular magnetic layer containing a plurality of magnetic layers, wherein at least one of the magnetic layers is a perpendicular magnetic layer as recited in claim 1 or 2.

7. A magnetic recording medium comprising a perpendicular magnetic layer containing a plurality of magnetic layers, wherein the uppermost layer of the magnetic layers is a perpendicular magnetic layer as recited in claim 1 or 2.

8. A magnetic recording medium according to claim 1 or 2, wherein a soft magnetic undercoat layer formed from a soft magnetic material is provided between the non-magnetic substrate and the orientation-regulating layer.

9. A magnetic recording medium according to claim 8, wherein the surface of the soft magnetic layer is oxidized or nitridized.

10. A magnetic recording medium according to claim 8, wherein a hard magnetic layer in which magnetic anisotropy is generally in a longitudinal direction is provided between the non-magnetic substrate and the soft magnetic undercoat layer.

11. A magnetic recording medium according to claim 10, wherein the magnetic recording medium is in the form of a disk, and wherein the hard magnetic layer is formed from a material containing a CoSm alloy or a $CoCrPtX_2$ alloy, wherein $X_2$ is at least one element selected from the group consisting of Pt, Ta, Zr, Nb, Cu, Re, Ni, Mn, Ge, Si, O, N, and B, has a coercive force of at least 500 Oe, and has a magnetization direction along a radial direction of the substrate.

12. A magnetic recording and reproducing apparatus comprising a magnetic recording medium and a magnetic head for recording data onto the medium and reproducing the data therefrom, wherein the magnetic recording medium is a magnetic recording medium as recited in claim 1 or 2.

* * * * *